United States Patent [19]

Cox, Jr.

[11] Patent Number: 5,685,000
[45] Date of Patent: Nov. 4, 1997

[54] METHOD FOR PROVIDING A LINGUISTICALLY COMPETENT DIALOGUE WITH A COMPUTERIZED SERVICE REPRESENTATIVE

[75] Inventor: Louis Anthony Cox, Jr., Denver, Colo.

[73] Assignee: U S West Technologies, Inc., Boulder, Colo.

[21] Appl. No.: 368,178

[22] Filed: Jan. 4, 1995

[51] Int. Cl.$^6$ .................................................. G06F 3/14
[52] U.S. Cl. ........................... 395/759; 395/613; 379/34; 379/68; 379/88
[58] Field of Search ............................... 395/759, 613, 395/2.66, 2.84; 379/34, 68, 88

[56] References Cited

U.S. PATENT DOCUMENTS

| | | | |
|---|---|---|---|
| 4,982,420 | 1/1991 | Theis | 379/68 |
| 5,255,305 | 10/1993 | Sattar | 379/34 |
| 5,452,340 | 9/1995 | Engelbeck et al. | 379/88 |

*Primary Examiner*—Jeffery Hofsass
*Assistant Examiner*—Andrew Hill
*Attorney, Agent, or Firm*—Brooks & Kushman

[57] ABSTRACT

Desired tasks are modeled as a plurality of database slots. Each of the slots is opportunistically fillable by a predetermined set of values in accordance with a predetermined set of user utterance recognition rules. The user utterance recognition rules include a first layer which recognizes questions and commands based upon co-occurrences of key words in a sentence, removes corresponding database slot values and generates a supplemental utterance. A second layer recognizes database word values irrespective of sentence context and fills the slot appropriately. Responsive utterances are generated in accordance with a predetermined set of condition-action rules. The condition-action rules are based on logical combinations of filled slot values and, in operation, provide a user with the desired perception of a linguistically competent dialog while at the same time eliciting further information to complete a desired task.

5 Claims, 5 Drawing Sheets

10 — MODELING A DESIRED TASK AS A PLURALITY OF DATABASE SLOTS, EACH FILLABLE BY A PREDETERMINED SET OF VALUES IN ACCORDANCE WITH A PREDETERMINED SET OF USER UTTERANCE RECOGNITION RULES

12 — OPPORTUNISTICALLY FILLING IN THE DATABASE SLOTS WITH RECOGNIZED VALUES

14 — GENERATING A RESPONSE UTTERANCE IN ACCORDANCE WITH A PREDETERMINED SET OF CONDITION-ACTION RULES BASED ON LOGICAL COMBINATIONS OF FILLED SLOT VALUES

| ORDER | CUSTOMER | TECHNICIAN | DAY | START TIME | TASK | SERVICE |
|---|---|---|---|---|---|---|
| 1 | GARY | | | | | |
| 2 | DICK | | | | | |
| 3 | WILL | | | | | |
| 4 | BUD | | | | | |
| 5 | TONY | | | | | |
| 6 | RON | | | | | |
| 7 | ANDY | | | | | |
| 8 | TIM | | | | | |
| 9 | PAUL | | | | | |
| 10 | MITCH | | | | | |

| ORDER | CUSTOMER | TECHNICIAN | DAY | START TIME | TASK | SERVICE |
|---|---|---|---|---|---|---|
| 1 | GARY | | | | | |
| 2 | DICK | | | | | |
| 3 | WILL | | | | | |
| 4 | BUD | | | | | |
| 5 | TONY  X | | | | | |
| 6 | RON | | | | | |
| 7 | ANDY | | | | | |
| 8 | TIM | | | | | |
| 9 | PAUL | | | | | |
| 10 | MITCH | | | | | |

*Fig. 3*

| ORDER | CUSTOMER | TECHNICIAN | DAY | START TIME | TASK | SERVICE |
|---|---|---|---|---|---|---|
| 1 | GARY | | | | | |
| 2 | DICK | | | | | |
| 3 | WILL | | | | | |
| 4 | BUD | | | | | |
| 5 | TONY  X | | | | | VOICE |
| 6 | RON | | | | | |
| 7 | ANDY | | | | | |
| 8 | TIM | | | | | |
| 9 | PAUL | | | | | |
| 10 | MITCH | | | | | |

*Fig. 4*

| ORDER | CUSTOMER | TECHNICIAN | DAY | START TIME | TASK | SERVICE |
|---|---|---|---|---|---|---|
| 1 | GARY | | | | | |
| 2 | DICK | | | | | |
| 3 | WILL | | | | | |
| 4 | BUD | | | | | |
| 5 | TONY  X | | FRIDAY | | INSTALL | VOICE |
| 6 | RON | | | | | |
| 7 | ANDY | | | | | |
| 8 | TIM | | | | | |
| 9 | PAUL | | | | | |
| 10 | MITCH | | | | | |

*Fig. 5*

| ORDER | CUSTOMER | TECHNICIAN | DAY | START TIME | TASK | SERVICE |
|---|---|---|---|---|---|---|
| 1 | GARY | | | | | |
| 2 | DICK | | | | | |
| 3 | WILL | | | | | |
| 4 | BUD | | | | | |
| 5 | TONY  X | | SATURDAY | 8:00 | INSTALL | VOICE |
| 6 | RON | | | | | |
| 7 | ANDY | | | | | |
| 8 | TIM | | | | | |
| 9 | PAUL | | | | | |
| 10 | MITCH | | | | | |

*Fig. 6*

| ORDER | CUSTOMER | TECHNICIAN | DAY | START TIME | TASK | SERVICE |
|---|---|---|---|---|---|---|
| 1 | GARY | | | | | |
| 2 | DICK | | | | | |
| 3 | WILL | | | | | |
| 4 | BUD | | | | | |
| 5 | TONY  X | | | | INSTALL | VOICE |
| 6 | RON | | | | | |
| 7 | ANDY | | | | | |
| 8 | TIM | | | | | |
| 9 | PAUL | | | | | |
| 10 | MITCH | | | | | |

*Fig. 7*

| ORDER | CUSTOMER | TECHNICIAN | DAY | START TIME | TASK | SERVICE |
|---|---|---|---|---|---|---|
| 1 | GARY | | | | | |
| 2 | DICK | | | | | |
| 3 | WILL | | | | | |
| 4 | BUD | | | | | |
| 5 | TONY  X | | WEDNESDAY | | INSTALL | VOICE |
| 6 | RON | | | | | |
| 7 | ANDY | | | | | |
| 8 | TIM | | | | | |
| 9 | PAUL | | | | | |
| 10 | MITCH | | | | | |

*Fig. 8*

| | 16 | 18 | 20 | 22 | 24 |
|---|---|---|---|---|---|
| ORDER | CUSTOMER | TECHNICIAN | DAY | START TIME | TASK | SERVICE |
| 1 | GARY | | | | | |
| 2 | DICK | | | | | |
| 3 | WILL | | | | | |
| 4 | BUD | | | | | |
| 5 | TONY   X | | WEDNESDAY | NOON | INSTALL | VOICE |
| 6 | RON | | | | | |
| 7 | ANDY | | | | | |
| 8 | TIM | | | | | |
| 9 | PAUL | | | | | |
| 10 | MITCH | | | | | |

*Fig. 9*

| | 16 | 18 | 20 | 22 | 24 |
|---|---|---|---|---|---|
| ORDER | CUSTOMER | TECHNICIAN | DAY | START TIME | TASK | SERVICE |
| 1 | GARY | | | | | |
| 2 | DICK | | | | | |
| 3 | WILL | | | | | |
| 4 | BUD | | | | | |
| 5 | TONY   X | | THURSDAY | NOON | INSTALL | VOICE |
| 6 | RON | | | | | |
| 7 | ANDY | | | | | |
| 8 | TIM | | | | | |
| 9 | PAUL | | | | | |
| 10 | MITCH | | | | | |

*Fig. 10*

METHOD FOR PROVIDING A LINGUISTICALLY COMPETENT DIALOGUE WITH A COMPUTERIZED SERVICE REPRESENTATIVE

TECHNICAL FIELD

This invention relates generally to interactive spoken dialogue systems. More particularly, the present invention relates to a method for providing a user with the perception of a linguistically competent dialogue with a computerized service representative so as to perform a desired task.

BACKGROUND ART

Prior art interactive spoken dialogue systems and methods have generally focused on understanding complete sentences in order to model desired tasks. Typically, these systems first try to recognize every word in an utterance and then, using sophisticated natural language programs, attempt to recreate an entire sentence structure. Only after the system recognizes an entire sentence can it generate an intelligible response. In such manner, a linguistically competent dialogue may be carried out with a user.

The drawbacks to this approach to task modeling are readily apparent. Namely, the prior art approach is highly complex and difficult to implement in practice because of the varying dialects and intonations of users. Extraordinary resources are also required, particularly memory, because of the many words that must be recognized in varying contexts within a sentence before any response may be formulated and generated.

Consequently, a need has developed for a simpler approach to task modeling which, like the prior art, will provide the perception of a linguistically competent dialogue, yet unlike the prior art, will not require extraordinary resources.

DISCLOSURE OF THE INVENTION

The principle object of the present invention is to provide a method which gives a user the perception of a linguistically competent dialogue with a computerized service representative so as to perform a desired task.

In carrying out the above-stated objective, a method is provided in accordance with the present invention for use in cooperation with a computer database. The method includes the initial modeling of a desired task as a plurality of database slots. Each of the slots is fillable by a predetermined set of values in accordance with a predetermined set of user utterance recognition rules. Following each user utterance, the database slots are opportunistically filled with recognized values. Thereafter, a responsive utterance is generated in accordance with a predetermined set of condition action rules. The condition-action rules are based on logical combinations of filled slot values and, in operation, provide a user with the desired perception of a linguistically competent dialogue while at the same time eliciting further information to complete the task.

In the preferred embodiment, the predetermined utterance recognition rules include a first layer which recognizes questions and commands based upon co-occurrences of key words in a sentence, removes (i.e. "blank out") corresponding database slot values, and generates a supplemental utterance. A second layer is further provided which recognizes database word values irrespective of sentence context, and fills the slot appropriately.

The above-described method of the present invention is specifically provided for use with a computerized representative such as, for example, a telephone service representative, so as to provide a customer with the perception of a linguistically competent dialogue with the representative. In the preferred embodiment, the dialogue is desired to effect a telephone service request such as, for example, the installation or removal of Voice Messaging Services (VMS), voice dialing, call waiting, call forwarding, etc. In this preferred embodiment, the database slots include headings such as customer, task, date, start time, service, etc.

The above objects and other objects, features, and advantages of the present invention are readily apparent from the following detailed description of the best mode for carrying out the invention when taken in conjunction with the accompanying drawings.

BRIEF DESCRIPTION OF THE DRAWINGS

FIG. 1 is a generalized block diagram of the method steps of the present invention; and FIGS. 2–10 are schematic diagrams illustrating the database slots of a computerized telephone service representative which may be filled in accordance with the method steps of FIG. 1.

BEST MODES FOR CARRYING OUT THE INVENTION

Figures 1, 2:
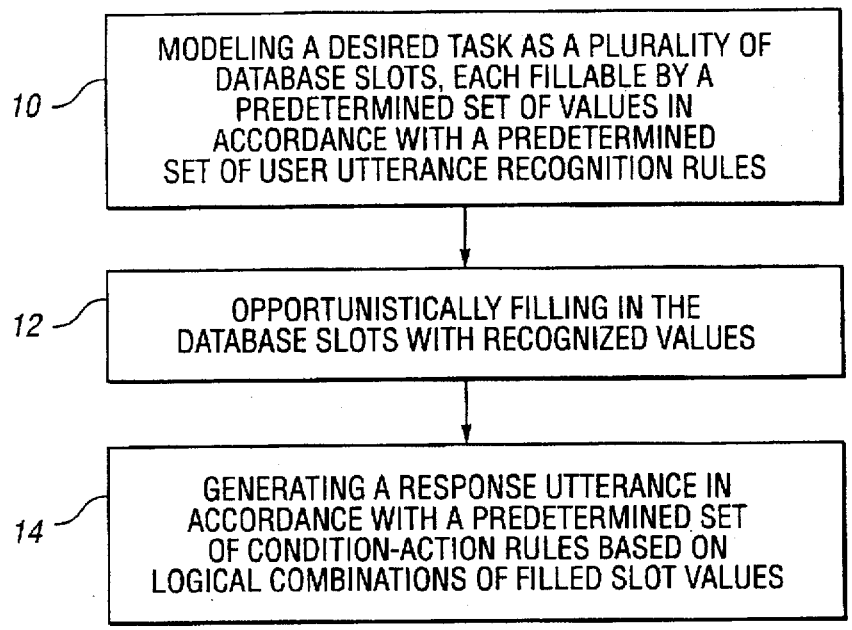

FIG. 1 of the drawings provides a block diagram of the generalized method steps of the present invention. As indicated above, the method is specifically directed for use with a computer database having memory and is operative to provide a user with the perception of a linguistically competent dialogue with a computerized service representative so as to perform a desired task.

As shown in FIG. 1, the method begins by modeling 10 the desired tasks as a plurality of database slots. Each of the slots is designed to be filled by one of a predetermined set of values in accordance with a predetermined set of user utterance recognition rules.

In a preferred embodiment, the user utterance recognition rules include a first layer of protocol which is operative to recognize user utterances in the form of questions and commands based upon co-occurrences of key word values in a sentence. This first layer is further operative to remove (i.e. "blank-out") corresponding database slot values and generate a supplemental utterance in an attempt to elicit further information from the user. This first layer of protocol, i.e. user utterances, which are in the form of questions and commands are provided top priority. They interrupt whatever agenda the system has. For example, key words such as "change," "day," "different", etc., when recognized alone or in predetermined co-occurrences with a sentence are all designed to trigger a response from the system and blank out previous slot values.

In keeping with the invention, the user utterance recognition rules further comprise a second protocol layer which is operative to recognize database word values irrespective of sentence context. Thus, the system scans whatever utterance is provided by the user and looks for a slot filling value, i.e., a day of the week, a type of service, a time of the day, etc.

Once the desired task has been modeled as a plurality of database slots as indicated above, the slots are opportunistically filled 12 with values recognized from the user utterances. The slot filling occurs subsequent to each user utterance. Significantly, neither the context of a word value in a sentence or the context of a sentence itself has an effect on the systems recognition of a database word value. The value will be recognized in any user utterance and the appropriate database slot will be filled accordingly.

Consider, for example, a dialogue situation wherein a user is asked "What service would you like installed or repaired?" In response, the user may state (1) "voice mail", (2) "voice mail on Tuesday", or (3) "Tuesday", as well as numerous other responses. Each response will be analyzed and the appropriate database slot will be filled regardless if the user utterance is necessarily appropriate. For example, in (1) above, the user's response is clearly appropriate and the system will fill the database slot under the heading "Service" with the user's selection of "voice mail." In (2), the system will fill both the database slots for "Service" and "Day" with the value voice mail and Tuesday, respectively. This will occur even though the system has not yet asked the user which day he or she would like the service installed or repaired. Finally, in (3), where the user's response of "Tuesday" is clearly unresponsive and inappropriate to the system's query of what service is desired, the system will nonetheless fill the database slot of "Day" with the selection "Tuesday." Thereafter, the system will generate a query requesting the user to identify what service he or she would like installed or repaired on "Tuesday."

In keeping with the invention, responsive utterances are generated 14 by the computer in accordance with a predetermined set of condition-action rules. The condition-action rules are based upon logical combinations of filled slot values. For example, if slots have been filled for "service" and "day", the condition-action rules are designed to generate a query asking the user the "time" of the desired day which the user would like the selected service to be installed or repaired. Together, the aforementioned steps provide the user with the desired perception of a linguistically competent dialogue.

The present invention may be better understood by reference to the following applications which describe the interaction between a user and a system incorporating the present invention to effect a telephone service request.

In accordance with the teachings of the present invention, the telephone service requests are first modeled as a plurality of corresponding database slots. Again, each of the slots are designed to be filled by a predetermined set of values in accordance with a predetermined set of user utterance recognition rules. With reference to FIG. 2 of the drawings, the database slots for this telephone service application may comprise, for example, "customer" 16, "day" 18, "start time" 20, "task" 22 and "service" 24, etc. Of course, other database slots may be utilized depending upon the desired application and the information necessary to complete the task. For example, the slots "scheduled end," "next order," "transit," "finding," "summarily," "phone," "confirmation," "service," "service 2," "service 3," "service 4," "last called," and "times called" may all be used in the above-described telephone service application. The aforementioned slots are thus referred to for exemplary purposes only and are not intended as a limitation to the claimed invention.

These database slots are filled in accordance with user utterance recognition rules. As referenced above, these rules include a first layer of protocol which have top priority and are designed to interrupt whatever agenda the system has. This first layer of protocol looks for co-occurrences of key words in a sentence and then blanks out old information in order to comply with the user's request. The user utterance recognition rules further include a second layer of protocol which merely looks for database values which may be recognized regardless of their context in a sentence or the context of the sentence itself within the user/system dialog.

Referring still to FIG. 2, user utterance recognition rules generated for filling the "customer" database slot may provide generally that any recognized name from a set of stored name values shall be used to fill the slot. In the example shown, the customer names "Gary", "Dick", "Will", "Bud", "Tony", "Ron", "Andy", "Tim", "Paul", and "Mitch" comprise the set of stored name values which are sought to be recognized. Obviously, in actual application, the set of stored names will be much greater.

In the alternative, rules may be written to recognize any name value which appears in a certain sentence context such as "Hello, this is_____", In such a case, any name value following "this is" will be extracted and used to fill the "customer" database slot. For example, when a system which incorporates the present invention is accessed, it may state "Welcome to US West's voice activated telephone service repair and installation system. Please state your name." In response, the user may state "Hello, this is Tony." The system will be designed to recognize the database value "Tony," fill in this value under the "customer" slot and through appropriate condition-action rules, generate the next query "Hello, Tony, what service would you like installed or repaired?" In the alternative, if the system does not recognize the user's name or the user does not state his or her name, the condition-action rules will nonetheless be designed to generate the same query yet without a greeting. Thus, for example, if the user responds merely "Hello", the condition-action rules will cause the system to generate a query "What service would you like installed or repaired?"

With each recognized database slot value, the condition action rules are designed to build up more into the utterance than is currently available. The "condition" part of the condition action rules are designed as boolean "and" logical combinations of slot values. For example, if a system, which incorporates the disclosed invention knows the customer name, but not the service, the appropriate action is to greet the customer by name and in such case, the next rule will be to ask the desired service.

The system may be further described with reference to the following example and FIGS. 3–6. In this first example, the user is familiar with the system as is apparent by the sample responses. The user may, therefore, begin a dialogue by stating "Hello, this is Tony." By applying predetermined user utterance recognition rules, the system will recognize the name "Tony", fill in the corresponding customer database slot with that value, and generate the responsive utterance "Hello Tony. What service do you want installed or repaired?" This first responsive utterance is generated based upon the condition-action rule that, if only the "customer" database slot is filled, the system will request of the customer the type of service desired, i.e. "What service would you like installed or repaired?"

In operation, the user may then respond "I do not know", "What are my choices?", or the like. In such case, the condition-action rules are designed to generate the response: "the following services are available to you: voice messaging, voice dialing, and call waiting". It should be noted that here, the condition-action rules are not only based on the currently filled database slots, but upon the user's response. The condition-action rules are therefore designed to recognize words such as "what", "choices", or "know" which, in conjunction with the currently filled database slot values, result in the above responsive utterance. These words are part of the above-described first layer of protocol of the user utterance recognition rules.

By way of further example, the user may respond, "I would like voice messaging". Recognizing the words, "voice messaging", the system will fill the "service" database slot with the entry, "voice", as shown in FIG. 4 and in accordance with predetermined condition-action rules generate the responsive utterance "Which do you need, installation or repair?" Upon recognizing the user's response "installation" and filling the appropriate slot, the condition-action rules are designed to review the filled slots of "customer", "task", and "service" and generate the responsive utterance "What day would you like us to come by to install your voice messaging?" Assuming the user responds "Friday", this word will be recorded and filled in the "day" database slot shown in FIG. 5. The responsive utterance "I have several times available on Friday. What time on Friday would you like a technician to stop by to install your voice messaging?" may then be generated.

In keeping with the invention, it should be understood that the present invention is further designed to replace (i.e. "blank out") entries which are no longer correct based upon a current user response. For example, in the telephone service dialogue referred to above, if the user were now to respond "Actually, Saturday is better", the system is designed to recognize "Saturday", delete the previous value under the "day" database slot, fill in the "Saturday" value and generate the responsive utterance "I have several times available on Saturday. What time on Saturday would you like a technician to stop by to install your voice messaging?" In this example, if the user were now to respond "I don't know" or "What are my choices?", the first layer of protocol of the user utterance recognition rules in cooperation with the system condition-action rules will review the currently filled slots and the user's utterance to generate the response "From 8:00 a.m. to 6:00 p.m."

In keeping with the invention, if the user were to respond "8:00 a.m. is fine", the "8:00 a.m." entry will be recognized, filled in the appropriate database slot "start time" as shown in FIG. 6. In accordance with predetermined condition-action rules, the following responsive utterance will be generated: "I have a technician available on Saturday at 8:00 a.m. Shall I confirm that time as an appointment? Please answer yes or no." Upon responding "yes", the corresponding database slot will be filled and, once again, in accordance with the system's condition-action rules, a responsive utterance may be generated such as "Appointment confirmed. Thank you for using U S West's appointment scheduling system. Please call back if we may help you again."

Importantly, a system which is operative to carry out the above-described method of the present invention need not understand entire sentences, only specified words. By applying simple user utterance recognition rules and condition-action rules based upon filled slot values, the present invention is operative to provide the intended perception to a user of a linguistically competent dialogue while at the same time performing a desired task.

Consider, for example, the following sample dialog between a user and a system incorporating the invention wherein the user is not familiar with the system design and operation. Again, once the system is called, it will be activated and will respond if a greeting such as "Hello, welcome to US West's appointment scheduling system. Please state your name." In response, the user may state "This is Tony calling." As in the above example, the system will recognize the database value "Tony" and fill in the "customer" database slot with this value.

Using condition-action rules, the system will thereafter respond "Hello Tony, what service would you like installed or repaired?" The user may then respond "I don't know." Using the first layer of protocol of the user utterance recognition rules, the system will recognize the words "don't" and "know" in the user's sentence and, with reference to the appropriate condition-action rule wherein no database slots are filled, may generate the following response: "The following services are available to you, voice messaging, voice dialing, and call waiting." Again, rather than make a selection, the user unfamiliar with the appointment scheduling system may ask for further information. For example, the user may respond "What is voice messaging?". Again, using the first layer of protocol, the system will recognize the key words "what" occurring within the same sentence as "voice messaging" and through predetermined condition-action rules generate the following response: "Voice messaging is like an answering machine without the machine."

By way of further example, the unfamiliar user may still desire further information. For example, the user may require information regarding the cost of a proposed service. Thus, the user may respond "How much does it cost?" Once again, the first layer of protocol of the user utterance recognition rules will recognize the words "how," "much," "cost" or any combination thereof and through appropriate condition-action rules generate the following response: "The service is free for a 30 day trial period. If you decide to keep it, it will cost $4.00 per month." The user may thereafter desire further information regarding additional services which have been identified by the system. For example, the user may respond "Tell me about voice dialing." As above, the words "tell," "about" and "voice dialing" or any combination thereof will be recognized and in accordance with the system's condition-action rules, the system will generate the following response: "Voice dialing allows you to make a call by speaking names."

The user may still further require information regarding other services which are available. The user may therefore respond "What else do you have?" Again, various combinations of words may be recognized in accordance with the system's first layer of protocol. For example, the words "what," "else" and "have" may be recognized and through the appropriate condition-action rules, the system may generate the following response: "The following services are available to you, voice messaging, voice dialing and call waiting." As seen, the user has now gone full circle and is back to his or her starting point wherein the system identified the available services.

By way of continuing example, the user may thereafter respond "Is that all?" The system may thereafter recognize the words "is" and "all" or other varying combinations of words and through condition-action rules generate the response "That is all my records show." Finally, the user may request that a desired service be installed or repaired. For example, the user may respond "Install voice dialing." At this point, the words "install" and "voice dialing" will be recognized and the appropriate database slots of "task" and "service" will be filled with the corresponding values "install" and "voice" as shown in FIG. 7.

Once again, through predetermined condition-action rules, the system will recognize that the task and service database slots have been filled and will recognize it needs to know a day and time for the desired service to be installed. The system will thus respond "What day would you like us to come by to do that?" The user may then respond "Wednesday" and this value will be recognized and filled in under the appropriate "day" database slot as shown in FIG. 8.

At this point, using predetermined condition-action rules, the system will recognize that the "task", "service" and "day" database slots have been filled and therefore it requires information regarding the "start time". The system may therefore respond "I have several times available on Wednesday. What time would you like a technician to stop by?" The user may then respond "What time is best?" Once again, the first layer of protocol of the system will recognize the user's query "what" along with the word "time" and through condition-action rules will generate the response "8 a.m. to 6 p.m." The user may thereafter respond "How about noon?" In keeping with the invention, the system will recognize the database value "noon" and fill in the appropriate start time as shown in FIG. 9. Through predetermined condition-action rules, the system may thereafter generate the response "I have a technician available at that time. Shall I confirm your appointment? Please answer yes or no."

At this point, the user could simply respond with a yes or no or, in the alternative, request a change of any of the filled database slot values. For example, the user could respond "Can I change the day?" The system will recognize the word "change" in combination with the word "day" and may generate the response "What day would you like instead?" The user may thereafter respond "How about Thursday?" As in the previous example, the system will now recognize the database slot value "Thursday" and change the previous "Wednesday" entry to "Thursday" as shown in FIG. 10.

Through predetermined condition-action rules, the system may thereafter respond "I have a technician available then. Shall I confirm that as your appointment? Please answer yes or no." Significantly, it is anticipated that although the system may request a yes or no response, users may respond in other ways. For example, the user may state "sure" which may be recognized as corresponding to a "yes" answer. Otherwise, the previous query would be repeated. If the utterance "sure" is recognized, the system may then generate the response "Thank you for using US West's appointment scheduling system. Please call back if we may help you again."

While the above examples illustrate responsive dialogue by a user, it should be understood that the present invention will work equally well even if the user's responses are inappropriate and even perhaps unintelligible. For example, once the system is accessed and asks the user to state his or her name, the user may simply respond "Friday." The system will recognize "Friday" and fill it in in the appropriate database slot under "day." Recognizing that the only information it currently has is a day, the system through appropriate condition-action rules may thereafter generate a query asking the user what service he or she would like installed on that day.

For example, if a response to the system's request for the user's name, the user states "Friday," the system may generate the query "What service would you like installed or repaired on Friday?" The user may thereafter respond "I have to be at work by 9a.m." Although this response is clearly inappropriate, the system will nonetheless recognize "9 a.m." and fill it in accordingly under the time database slot. Once again, recognizing that only day and time information is available, the system through appropriate condition-action rules may request the user to identify what service is desired. For example, the system may generate the query "What service would you like installed or repaired on Friday?" As readily seen, in like manner, various other database slots may be filled while providing the user with the illusion of a linguistically competent dialogue.

While the best modes for carrying out the invention have been described in detail, those familiar with the art to which this invention relates will recognize various alternative designs and embodiments for practicing the invention as defined by the following claims.

What is claimed is:

1. For use in cooperation with a computer database, a method for providing a user with a perception of a linguistically competent dialogue with a computerized service representative so as to perform a desired task, the method comprising:

modeling the desired task as a plurality of database slots, each one of the plurality of database slots fillable by one of a predetermined set of database word values recognized in utterances of the user in accordance with a predetermined set of user utterance recognition rules;

following each user utterance, opportunistically filling in the database slots with recognized database word values; and following each user utterance, generating a responsive utterance in accordance with a predetermined set of condition-action rules based on logical combinations of filled database slots thereby providing to the user said perception of a linguistically competent dialogue while eliciting further information from the user to complete the desired task.

2. The method of claim 1, wherein the predetermined set of user utterance recognition rules comprises:

a first layer operative to recognize questions and commands of the user based upon co-occurrences of key database word values in sentences in the utterances of the user, remove database word values from corresponding database slots, and generate a supplemental utterance to elicit further information from the user; and a second layer operative to recognize database word values in utterances of the user irrespective of sentence context.

3. For use in cooperation with a computer database, a method for providing a telephone customer with a perception of a linguistically competent dialogue with a computerized service representative so as to effect a telephone service request, the method comprising:

modeling available telephone service requests as a plurality of database slots, each one of the plurality of database slots fillable by one of a predetermined set of database word values recognized in utterances of the telephone customer in accordance with a predetermined set of telephone customer utterance recognition rules;

following each telephone customer utterance, opportunistically filling in the database slots with recognized database word values; and following each telephone customer utterance, generating a responsive utterance in accordance with a predetermined set of condition-action rules based on logical combinations of filled database slots thereby providing to the telephone customer said perception of a linguistically competent dialogue while eliciting further information from the telephone customer to complete the telephone service request.

4. The method of claim 3, wherein the plurality of database slots comprise customer, tasks, date, start time, and service.

5. The method of claim 3, wherein the predetermined set of telephone customer utterance recognition rules comprises:

a first layer operative to recognize questions and commands of the telephone customer based upon co-occurrences of key database word values in sentences in the utterances of the telephone customer, remove database word values from corresponding database slots, and generate a supplemental utterance to elicit further information from the telephone customer; and a second layer operative to recognize database word values in utterances of the telephone customer irrespective of sentence context.

* * * * *